United States Patent [19]

Higashi et al.

[11] Patent Number: 4,683,502
[45] Date of Patent: Jul. 28, 1987

[54] VIDEO DISC TYPE RECORDING AND REPRODUCING SYSTEM WITH INTERFERENCE REDUCTION FILTER

[75] Inventors: Ryoji Higashi; Satoru Nomura, both of Yamanashi, Japan

[73] Assignee: Pioneer Electronic Corporation, Tokyo, Japan

[21] Appl. No.: 527,721

[22] Filed: Aug. 30, 1983

[30] Foreign Application Priority Data

Aug. 30, 1982 [JP] Japan .................................. 57-149100
Mar. 18, 1983 [JP] Japan .................................. 58-45780
Jul. 30, 1983 [JP] Japan ........................... 58-119400[U]

[51] Int. Cl.⁴ .......................... H04N 5/85; H04N 5/92
[52] U.S. Cl. ..................................... 358/342; 358/343; 360/19.1
[58] Field of Search ............... 358/343, 330, 342, 341, 358/335, 310; 360/19.1, 132

[56] References Cited

U.S. PATENT DOCUMENTS

| | | | |
|---|---|---|---|
| 3,911,476 | 10/1975 | Keizer | 358/343 X |
| 3,934,263 | 1/1976 | Palmer | 358/343 X |
| 3,969,756 | 7/1976 | Palmer et al. | 358/342 X |
| 4,295,154 | 10/1981 | Hata et al. | 360/19.1 X |
| 4,388,654 | 6/1983 | Mehrotra | 358/343 |
| 4,393,489 | 7/1983 | Mehrotra | 358/343 X |
| 4,399,329 | 8/1983 | Wharton | 358/343 X |
| 4,450,488 | 5/1984 | Golding | 358/343 X |
| 4,480,270 | 10/1984 | Wilkinson | 358/343 X |
| 4,491,880 | 1/1985 | Kojima et al. | 358/343 X |
| 4,492,986 | 1/1985 | Kono et al. | 358/343 X |

Primary Examiner—Raymond F. Cardillo
Assistant Examiner—Wayne R. Young
Attorney, Agent, or Firm—Sughrue, Mion, Zinn, Macpeak and Seas

[57] ABSTRACT

A video disc recording/reproducing system is improved by preventing secondary or higher order sidebands of the FM modulated video signal from affecting an audio signal multiplexed with the video signal.

8 Claims, 16 Drawing Figures

VIDEO DISC TYPE RECORDING AND REPRODUCING SYSTEM WITH INTERFERENCE REDUCTION FILTER

BACKGROUND OF THE INVENTION

The present invention relates to a video disc type recording and reproducing system for multiplexed video and audio signals, and, more particularly, to such a system in which the influence of sidebands of the frequency-modulated video signal on the frequency-modulated audio signal is eliminated.

Systems in which video information and audio information are recorded on a video disc and are simultaneously reproduced have been known. One thereof is disclosed in U.S. Pat. No. 3,969,756 and is shown in FIG. 1, schematically. In FIG. 1, a video carrier of, for example, 8.2 MHz is frequency-modulated with the video information by a frequency modulator 1 so that the sync level, the pedestal level and the white peak level thereof become, for example, 7.6 MHz, 8.1 MHz and 9.3 MHz, respectively.

At least one audio signal is also frequency-modulated by a frequency modulator 2, and outputs of the frequency modulators 1 and 2 are added by an adder circuit 3. An output of the adder circuit 3 is supplied to a limiter 4 by which an amplitude of the adder output is limited, and pulse width modulation is performed. An output of the limiter is supplied to an electrical/optical (E/O) modulator 5 in which a laser beam from a laser source 6 is modulated by the limiter output, and the resultant signal is recorded on a video disc 7 in a known manner. Upon reproduction, the recorded information is picked up by a pick-up 8 and amplified by an amplifier 9. An output of the amplifier 9 is suitably divided and the resultant video and audio information are detected by detectors 10 and 11, respectively.

FIG. 2a shows an example of the frequency spectrum of the output of the limiter 4. In FIG. 2a, letter A represents the frequency band of the frequency-modulated video signal, $B_1$ and $B_2$ are the primary sidebands thereof and $C_1$ and $C_2$ are the secondary sidebands thereof. D and E are audio signal carriers when the audio system is a 2-channel or bilingual system. The frequency band width necessary to demodulate the video signal is from 3.9 to 13.5 MHz in the NTSC system in which the primary sidebands are included, because the modulation index is unity or smaller. Therefore, it is usual to set the audio subcarriers at, for example, 2.3 MHz and 2.8 MHz, so that these frequencies are out of the above frequency band necessary for video signal demodulation.

When the video input is composed of a ramp signal combined with a Y (brightness) component, the secondary sideband of the Y component is from 2.6 to 3.5 MHz, which covers at least a portion of the audio subcarriers.

Although the level of the secondary sideband of the video RF signal is lower than that of the primary sideband, it still affects the audio subcarriers, because the level of the audio subcarriers is usually set at around one tenth the video carrier level, and may be further lowered by 6 dB by passage through the limiter 4. Therefore the carrier to noise ratio (C/N) of the frequency-modulated audio signal is degraded, resulting in a degraded S/N ratio and reproduction quality.

Further, in a four channel audio system, a subcarrier of, for example, 47.2 KHz is frequency-modulated with audio signals from 2 additional channels, respectively, and these frequency-modulated subcarriers are added to the main channel signals. Then, the main carriers of 2.3 MHz and 2.8 MHz are frequency-modulated with the resultant signals, respectively. In this case, the effect of the secondary and/or higher sidebands of the, frequency-modulated video signal on the audio signals becomes more severe.

Further, since the dynamic range of the audio information in the conventional video disc type recording and reproducing system, in which an analog audio signal is directly frequency-modulated, is as small as 60–65 dB, it is relatively difficult to obtain a high quality reproduction signal.

SUMMARY OF THE INVENTION

An object of the present invention is to provide a video disc type recording and reproducing system in which the effect of secondary and/or higher order sidebands of the frequency-modulated video signal on the reproduction of the audio signal multiplexed with the video signal is eliminated.

Another object of the present invention is to provide a video disc type recording and reproducing system in which high quality signal reproduction is realized.

According to the present invention, at least the lower one of the secondary sidebands of the video RF signal, which overlaps the audio carrier frequencies, is removed, so that the audio signals are not influenced thereby. The elimination of the secondary or higher order sidebands of the video signal does not affect reproduction of the video signal since the frequency range necessary to reproduce the video signal spans only the primary sidebands.

Preferred embodiments of the present invention will hereinafter be described with reference to the accompanying drawings.

DETAILED DESCRIPTION OF THE PREFERRED EMBODIMENTS

Figure 1:
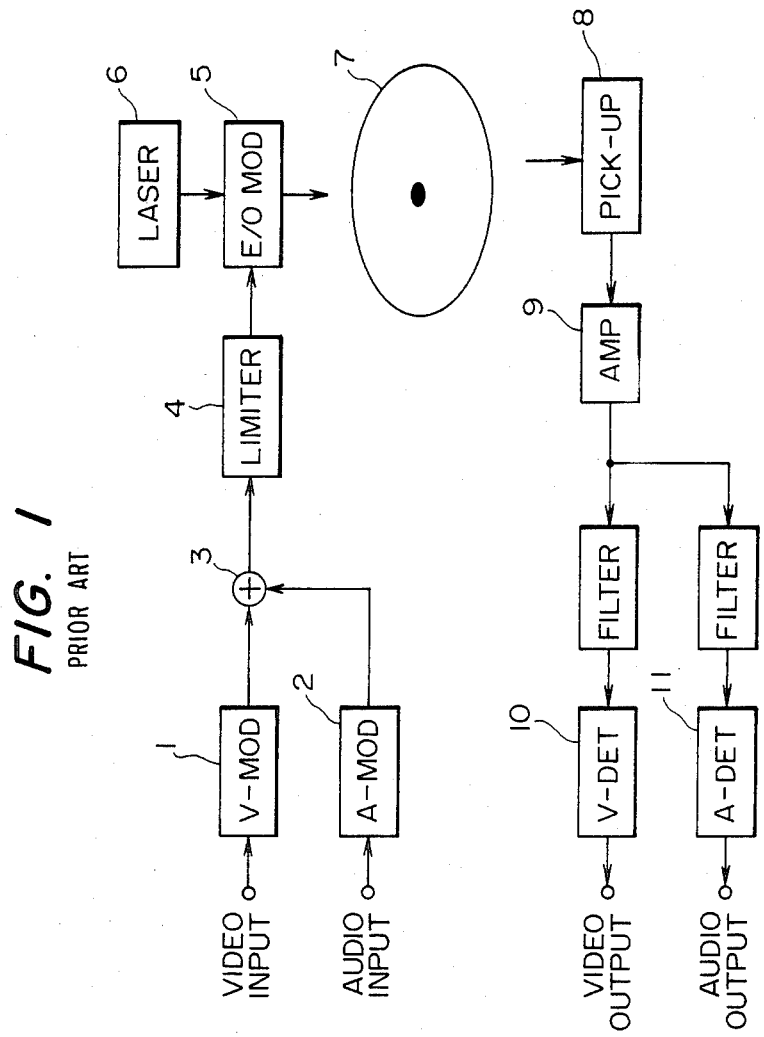
FIG. 1 is a block diagram of a typical example of a conventional video disc type recording and reproducing system.
Figure 2A:
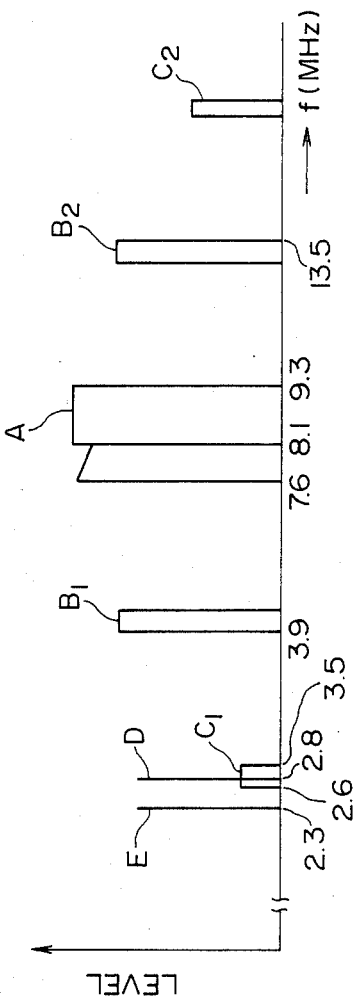
FIG. 2a shows the frequency spectrum of frequency-modulated video and audio signals.
Figure 2B:
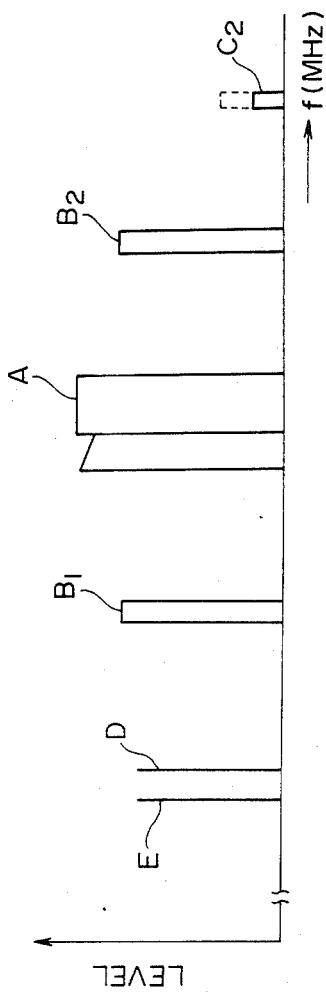
FIG. 2b shows the frequency spectrum according to the present invention.
Figure 3:
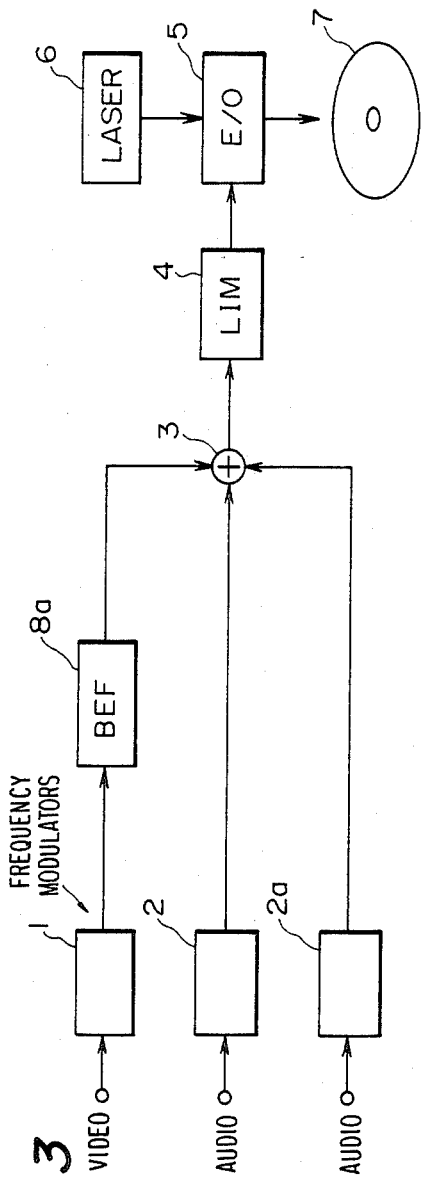
FIG. 3 is a block diagram of an embodiment of the recording system of the present invention.
Figure 4:
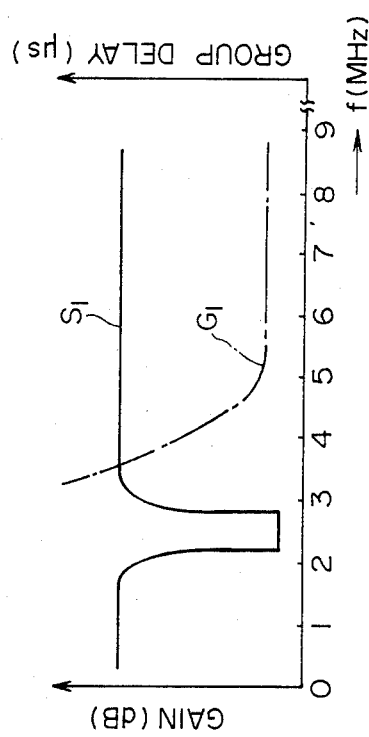
FIG. 4 is a characteristic curve of a band eliminating filter used in the embodiment of FIG. 3.
Figure 5:
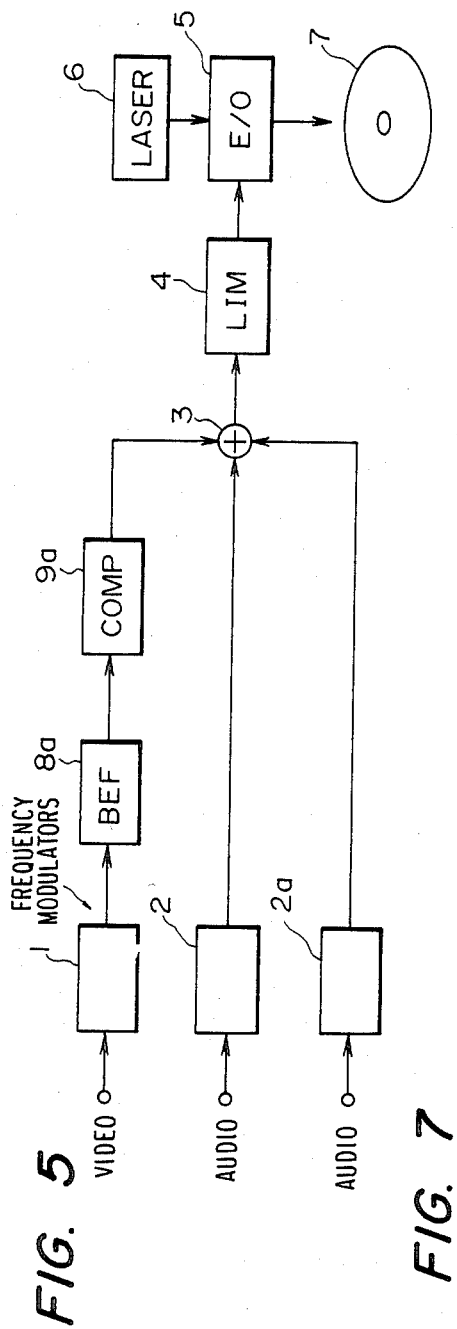
FIG. 5 is a block diagram of another embodiment of the present invention.

In FIG. 3, the recording system according to the present invention differs from the conventional system in FIG. 1 in that a band eliminating filter (BEF) 8a is provided between the video frequency modulator 1 and adder 3. Reference numerals 2 and 2a represent respective frequency modulators for the two audio signals. The BEF 8a has band eliminating characteristics such as shown by a curve $S_1$ in FIG. 4. That is, the BEF 8a prevents or at least restricts passage of a frequency range from about 2 MHz to about 3 MHz, so that at least the lower of the secondary sidebands $C_1$ (FIG. 2) of the video signal is eliminated as shown in FIG. 2b. In this case, the video RF signal may be distorted in either amplitude or phase or both due to the existence of the filter 8a. That is, the BEF may exhibit group delay characteristics as shown by a chain line $G_1$ in FIG. 4, which causes the deformation of the demodulated video signal. In order to eliminate this problem, it is possible to use a notch filter as the filter 8a, or further connect a group delay compensation circuit 9a to the output of the BEF 8a as shown in FIG. 5.

Figure 6:
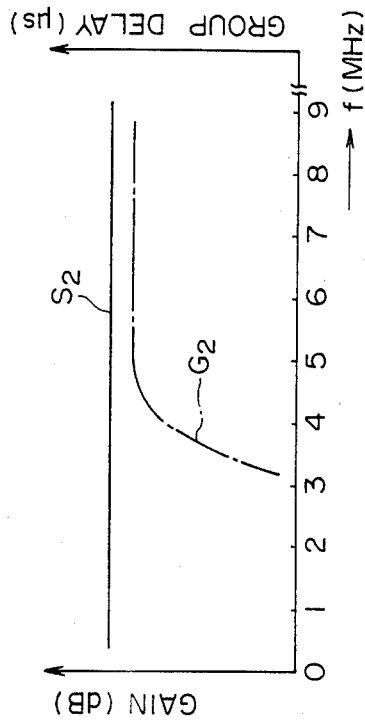
FIG. 6 is a characteristic curve of a compensating circuit of FIG. 5.

The compensating circuit 9a has a constant gain $S_2$ and group delay characteristics as shown by a chain line $G_2$ in FIG. 6, which compensates for the group delay characteristics $S_1$ of the BEF 8.

Alternatively, it is possible to vary the attenuation of the BEF 8a in proportion to the amount of high hormonics of the video RF signal falling in the audio RF range, so that control of the attenuation of the BEF can be performed according to a disturbance of the audio RF signal due to the video RF signal.

Figure 7:
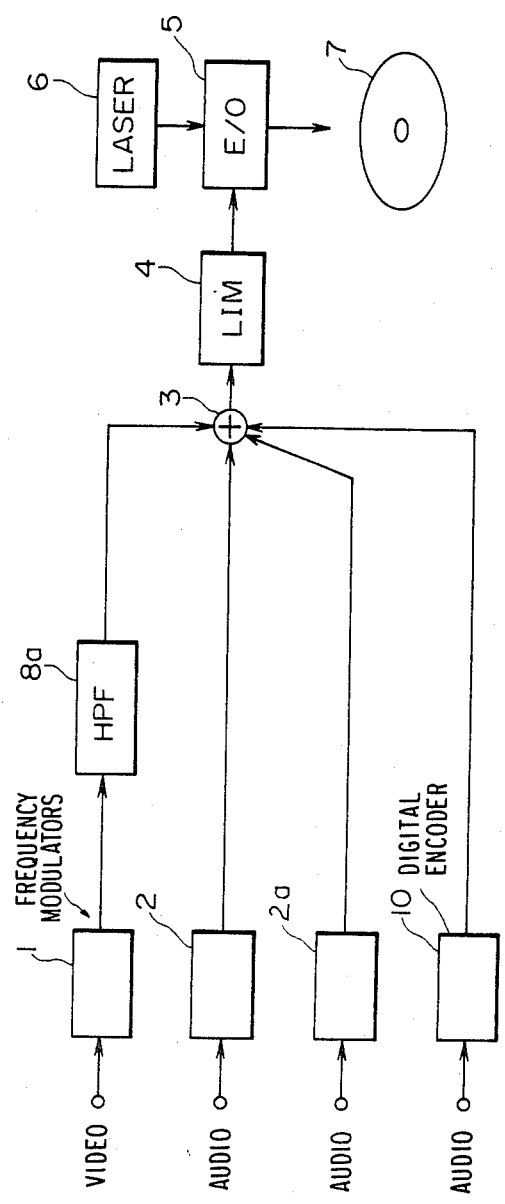
FIG. 7 is a still further embodiment of the present invention.

FIG. 7 shows another embodiment of the present invention which differs from the system in FIG. 3 in that a digital encoder 10 is provided. The encoder 10 has an input to which the audio signal is supplied. An output of the encoder 10 is connected to the adder 3. In this case, the two audio signals supplied to the respective frequency modulators 2 and 2a are also supplied to the digital encoder 10 and digitized in a time sharing manner using a suitable modulation system such as pulse-code-modulation (PCM), to convert them into a series of pulses which are then added in the adder 3 to the outputs of modulators 2 and 2a. In this case, the eight to fourteen modulation (EFM) system may be used. In such case, the frequency spectrum of the digital format includes pulses having widths of 3T to 11T where T is the bit period of the PCM signal. That is, 3T corresponds to about 720 KHz, 4T to about 540 KHz and 11T to about 200 KHz. These pulses are limited in level to about one tenth the level of the video main carrier and are added to the outputs of the filter 8a and the modulators 2 and 2a.

The filter 8a may be a high pass filter (HPF) or a band pass filter (BPF).

The resultant composite signal from the limiter 4 is cut around the zero crossing level and amplified to obtain a pulse-width-modulated signal.

Figure 8:
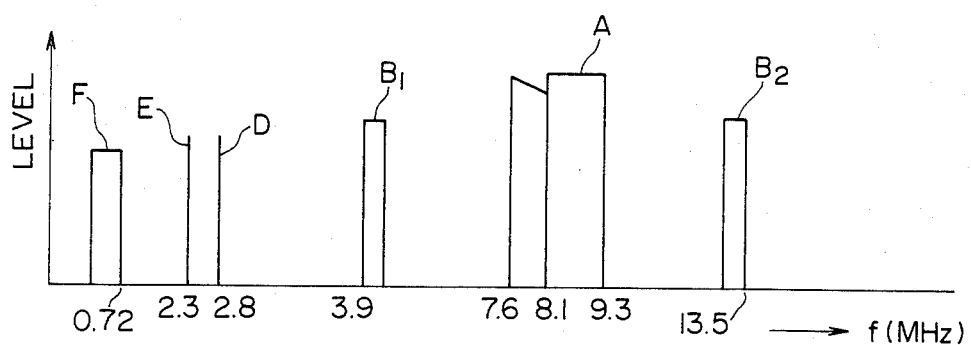
FIG. 8 is the frequency spectrum of frequency-modulated video and audio signals in the embodiment in FIG. 7.

FIG. 8 shows the frequency spectrum at the output of the adder 3 in which at the lower end is the spectrum F of the digital audio signal component.

Figure 9A:
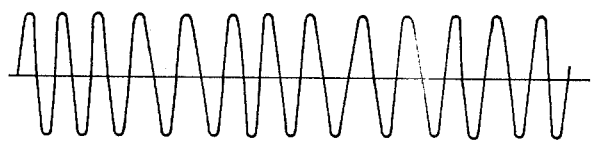
FIG. 9a illustrates the output waveform of the band pass filter 8a in FIG. 7.
Figure 9B:
FIG. 9b illustrates an audio output from one of the modulators 2 and 2a in FIG. 7.
Figure 9C:
FIG. 9c illustrates the waveform of the output of the digital encoder 10 in FIG. 7.
Figure 9D:
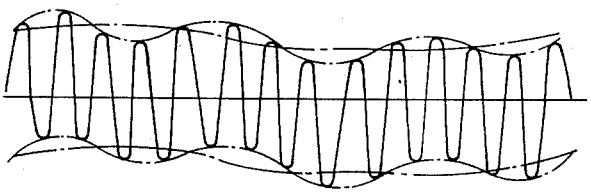
FIG. 9d illustrates a composite waveform of the output of the adder 3 in FIG. 7.
Figure 9E:
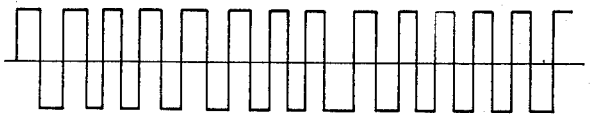
FIG. 9e illustrates the pulse width modulated output of the limiter 4 in FIG. 7.

FIG. 9 shows the waveforms at various points in the system of FIG. 7, in which FIG. 9a is the output waveform of the band pass filter 8a, FIG. 9b is an audio output from one of the modulators 2 and 2a, FIG. 9c is the waveform of the output of the digital encoder 10, FIG. 9d is a composite waveform of the output of the adder 3 and FIG. 9e is the pulse width modulated output of the limiter 4. In FIG. 9c, the output waveform of the digital encoder 10 theoretically takes a step form as shown by the dotted line. However, due to restrictions in the frequency characteristics of the associated circuits, the waveform becomes more as shown by the solid line, in practice. The waveform in FIG. 9e is obtained by cutting the waveform in FIG. 9d at around the zero crossing levels and amplifying the resulting waveform, or by using a zero level comparator.

It is possible to make the dynamic range of the digitized audio information about 90 dB or more, and thus the sound quality can be much improved as compared with recording using direct frequency modulation. In this embodiment, since both the directly frequency-modulated signal and the PCM signal are recorded together with the video signal, either of audio signals can be selectively reproduced.

Figures 10, 11:
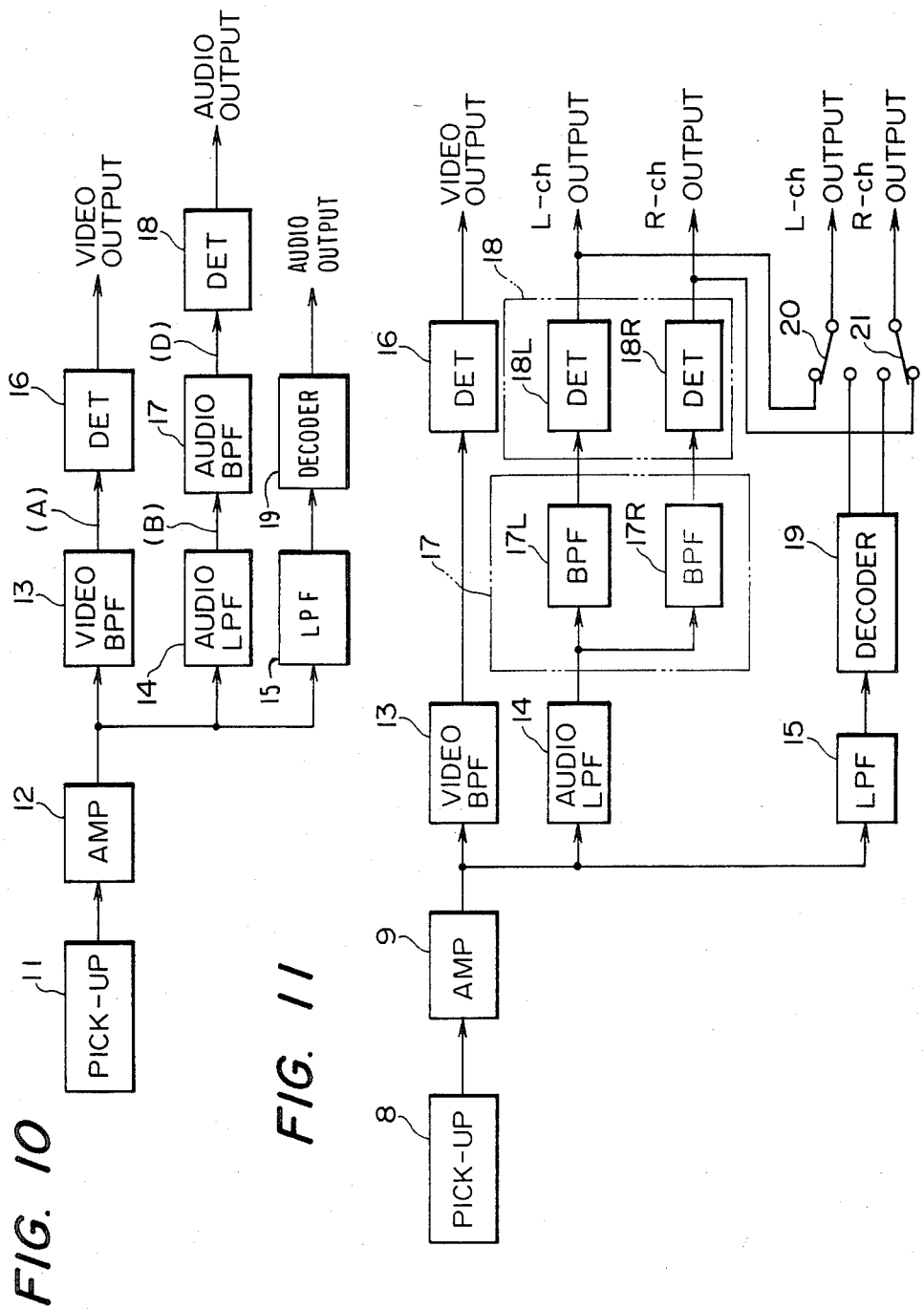
FIG. 10 is an embodiment of the reproducing system of the present invention.
FIG. 11 is another embodiment of the reproducing system of the present invention.

FIG. 10 is a reproducing system suitable for the recording system of FIG. 3. In FIG. 10, the readout RF signal from a pick-up 8 is amplified by an amplifier 9 and supplied to a video band pass filter 13, an audio low pass filter 14 and a low pass filter 15. An output of the band pass filter 13 is supplied to a video detector 16 and demodulated thereby. An output of the low pass filter 14, which passes frequency components lower than 2.8 MHz, is supplied to a band pass filter 17, which passes only the audio carrier, and the carrier component is detected by a detector 18.

An output of the low pass filter 15, which passes only the digital audio information, is supplied to a decoder 19 and decoded thereby to form an audio signal.

FIG. 11 shows, in block diagram, another embodiment of the reproducing system according to the present invention, which is suitable for use with the recording system of FIG. 7. In FIG. 11, the output of the amplifier 9 is supplied to a low pass filter 15, to derive only the digital audio component F of FIG. 8, and an output of the filter 15 is decoded by a decoder 19.

As mentioned with reference to FIG. 7, the two audio signals are both FM processed and PCM processed. That is, the signal picked-up by the pick-up 8 contains the FM processed video signal, the FM processed audio signals and the PCM processed, time shared audio signals. The picked-up signal is amplified by the amplifier 9 and supplied to the video band pass filter 13, the audio low pass filter 14 and the low pass filter 15, by which frequency ranges covering the secondary and higher order sidebands of the video signal are removed. An output of the video band pass filter 13 is demodulated by the detector 16 to provide a video output as in the embodiment of FIG. 10. The audio signal component of the signal supplied from the amplifier 9 to the audio low pass filter 14 is passed through the latter and supplied to band pass filters 17R and 17L. The filter 17L is designed to pass the frequency band centered at, for example, 2.3 MHz, and the filter 17R is designed to pass the frequency band centered at 2.8 MHz. Therefore, the frequency band centered at 2.3

MHz is demodulated by detector 18L to provide a L-channel audio output, and in a similar manner the frequency band centered at 2.8 MHz is passed through the band pass filter 17R and demodulated by detector 18R to provide an R-channel audio output.

The signal supplied to the low pass filter 15 is rejected, except for the frequency band covering the frequency spectrum F composed of the time shared PCM components shown in FIG. 8. Therefore, the frequency component F is supplied to the decoder 19 and decoded separately, to provide L-channel and R-channel outputs.

The L and R channel outputs from the detectors 18L and 18R and the L and R channel outputs from the decoder 19 are selectable by means of a pair of switches 20 and 21. Each of the switches 20 and 21 has a pair of contacts, one contact of which is connected to the outputs of the detectors 18L and 18R, respectively, and the other contact of which is connected to the outputs of the decoder 19. Therefore, by operating the switches 20, 21, it is possible to derive L and R channel audio outputs from either the detectors 18L and 18R or the decoder 19.

What is claimed is:

1. A video disc type recording and reproducing system, comprising:
   recording means, said recording means including: a first frequency modulator for modulating a video signal; a second frequency modulator for modulating at least an audio signal; a digital encoder connected in parallel with said second frequency modulator for digitally encoding said audio signal; filter means connected to an output of said first frequency modulator for removing a frequency component of the frequency-modulated video signal which covers a frequency component of the frequency-modulated audio signal from said second frequency modulator, said filter means comprising a high pass filter for passing only components having frequency higher than the lower secondary sideband of the modulated video signal; an adder circuit connected to an output of said filter means and to outputs of said second frequency modulator and digital encoder; a limiter connected to an output of said added circuit for pulse width modulating an output of said adder circuit; and an electrical/optical modulator connected to said limiter;
   reproducing means, said reproducing means including: an information pick-up; an amplifier coupled to said pick-up; a video detector means for detecting the video signal component in the output of said amplifier to provide a video output signal; an audio detector means for detecting the audio signal component in the output of said amplifier to provide a first audio output signal; and a decoder means for decoding the digitally encoded audio signal component in the output of said amplifier to provide a second audio output signal.

2. A system as claimed in claim 1, wherein said recording means further comprises a compensating circuit connected between said filter and said adder circuit, said compensating circuit having a substantially constant gain and a group delay characteristic such as will substantially cancel out a group delay characteristic of said filter.

3. A system as claimed in claim 1, said recording means further including a third frequency modulator for modulating a second audio signal, an output of said third frequency modulator being supplied to said adder circuit.

4. A system as claimed in claim 1, said recording means further including a third frequency modulator for modulating a second audio signal, said digital encoder receiving said first and second audio signals and digitizing the same in a time sharing manner, outputs of said digital encoder and said third frequency modulator being supplied to said adder circuit.

5. A system as claimed in claim 1, wherein said reproducing means further includes a video band pass filter coupled to the output of said amplifier for providing said amplifier output to said video detector means, and an audio low pass filter coupled to the output of said amplifier for providing said amplifier output to said audio detector means.

6. A system as claimed in claim 5, wherein said reproducing means further comprises audio band pass filter means for coupling an output of said audio low pass filter to said audio detector means.

7. A system as claimed in claim 6, wherein said reproducing means further includes an additional low pass filter coupled to the output of said amplifier for providing the digitally encoded audio signal component of said amplifier output to said decoder means.

8. A system as claimed in claim 7, said reproducing means further including switching means for selecting an output of either said audio detector means or said decoder.

* * * * *